(12) United States Patent
Kornecki et al.

(10) Patent No.: US 10,004,174 B2
(45) Date of Patent: Jun. 26, 2018

(54) TRANSPLANTER FOR A WALK-BEHIND TRACTOR

(71) Applicant: The United States of America, as represented by the Secretary of Agriculture, Washington, DC (US)

(72) Inventors: Ted S. Kornecki, Auburn, AL (US); Corey M. Kichler, Auburn, AL (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 20 days.

(21) Appl. No.: 15/280,605

(22) Filed: Sep. 29, 2016

(65) Prior Publication Data

US 2018/0084712 A1    Mar. 29, 2018

(51) Int. Cl.
*A01C 11/02* (2006.01)
*A01C 5/06* (2006.01)

(52) U.S. Cl.
CPC .............. *A01C 11/02* (2013.01); *A01C 5/062* (2013.01); *A01C 5/064* (2013.01); *A01C 5/068* (2013.01)

(58) Field of Classification Search
CPC ......... A01C 11/02; A01C 11/006; A01C 5/06; A01C 5/066; A01C 5/068; A01C 5/064; A01C 5/062
USPC ................................. 111/104–107
See application file for complete search history.

(56) References Cited

U.S. PATENT DOCUMENTS

| 4,290,373 | A | * | 9/1981 | Boots | A01C 11/02 111/103 |
| 5,224,554 | A | * | 7/1993 | Poll | A01C 11/02 111/149 |
| 5,477,791 | A | * | 12/1995 | Nakashima | A01C 11/025 111/104 |
| 5,823,126 | A | * | 10/1998 | Kolk | A01C 11/02 111/100 |
| 8,763,302 | B2 | * | 7/2014 | Morse | A01G 9/108 111/104 |
| 2002/0043196 | A1 | * | 4/2002 | Pizzirani | A01C 11/02 111/109 |
| 2013/0175105 | A1 | * | 7/2013 | Gallazzini | B62D 11/006 180/170 |
| 2016/0088786 | A1 | * | 3/2016 | Kornecki | A01B 49/065 111/158 |

* cited by examiner

*Primary Examiner* — John Weiss
(74) *Attorney, Agent, or Firm* — John D. Fado; Robert D. Jones

(57) ABSTRACT

The transplanter is designed to harness power from a walk-behind tractor to help small farmers transplant (among other things) seedling vegetables. As a farmer guides the walk-behind tractor, a movable feeder tube assembly comprising a plurality of feeder tubes moves latterly back and forth. When a feeder tube aligns with a pivotable transfer tube, a seedling in the feeder tube is deposited in the transfer tube so that the seedling descends down the transfer tube into a furrow for planting. The transfer tube then pivots so that a kicker panel on the bottom of the transfer tube pushes the seedling rearwardly and thereby helps to enable the seedling to remain vertical.

19 Claims, 7 Drawing Sheets

TRANSPLANTER FOR A WALK-BEHIND TRACTOR

FIELD OF THE INVENTION

The disclosed method and apparatus relates to a mechanism for transplanting plants. Specifically, the method and apparatus described herein relates to transplanting vegetables and other seedlings using a walk-behind tractor.

BACKGROUND OF THE INVENTION

Vegetable production on small farms and gardens has predominately relied on hand labor. One activity that is especially tedious and time consuming is the process of transplanting vegetables from small pots into planting rows. Hand transplanting involves physically strenuous exertion due to continuous bending and stooping. Most small scale producers who grow vegetables for local community markets and Community Supported Agriculture (CSAs) already own relatively inexpensive walk-behind tractors with power take-off (PTO) capabilities, however, there are currently no automated mechanical transplanters that work with walk-behind tractors.

The need exists for an effective transplanting tool to mechanically transplant vegetables using small scale walk-behind tractors. The transplanter described herein enables small farmers to utilize power from the walk-behind tractor (through the tractor's PTO) to effectively transplant vegetable crops and to ensure good root system-to-soil contact. The transplanter is operated by one person who simultaneously operates the transplanter and drives the walk-behind tractor. In the preferred embodiment, auxiliary racks of transplant vegetables can be attached to the tractor to enable the operator to reload the transplanter and thereby continuously transplant multiple plants. In a further alternative embodiment, the transplanter can be configured to plant more than one row simultaneously.

SUMMARY OF THE INVENTION

This disclosure is directed to a transplanter powered by a walk-behind tractor. A moveable feeder tube assembly moves latterly as the walk-behind tractor advances. A plurality of feeder tubes are mounted on the moveable feeder tube assembly above a pivotable transfer tube. The transplanter is designed so that—as one of the feeder tubes aligns with the transfer tube, a seedling in the feeder tube is deposited in the transfer tube so that the seedling descends down the transfer tube into a furrow for planting. The transfer tube then pivots so that a kicker panel on the bottom of the transfer tube pushes the seedling rearwardly and thereby helps the seedling to remain vertical.

DETAILED DESCRIPTION OF PREFERRED EMBODIMENTS

Figure 1:
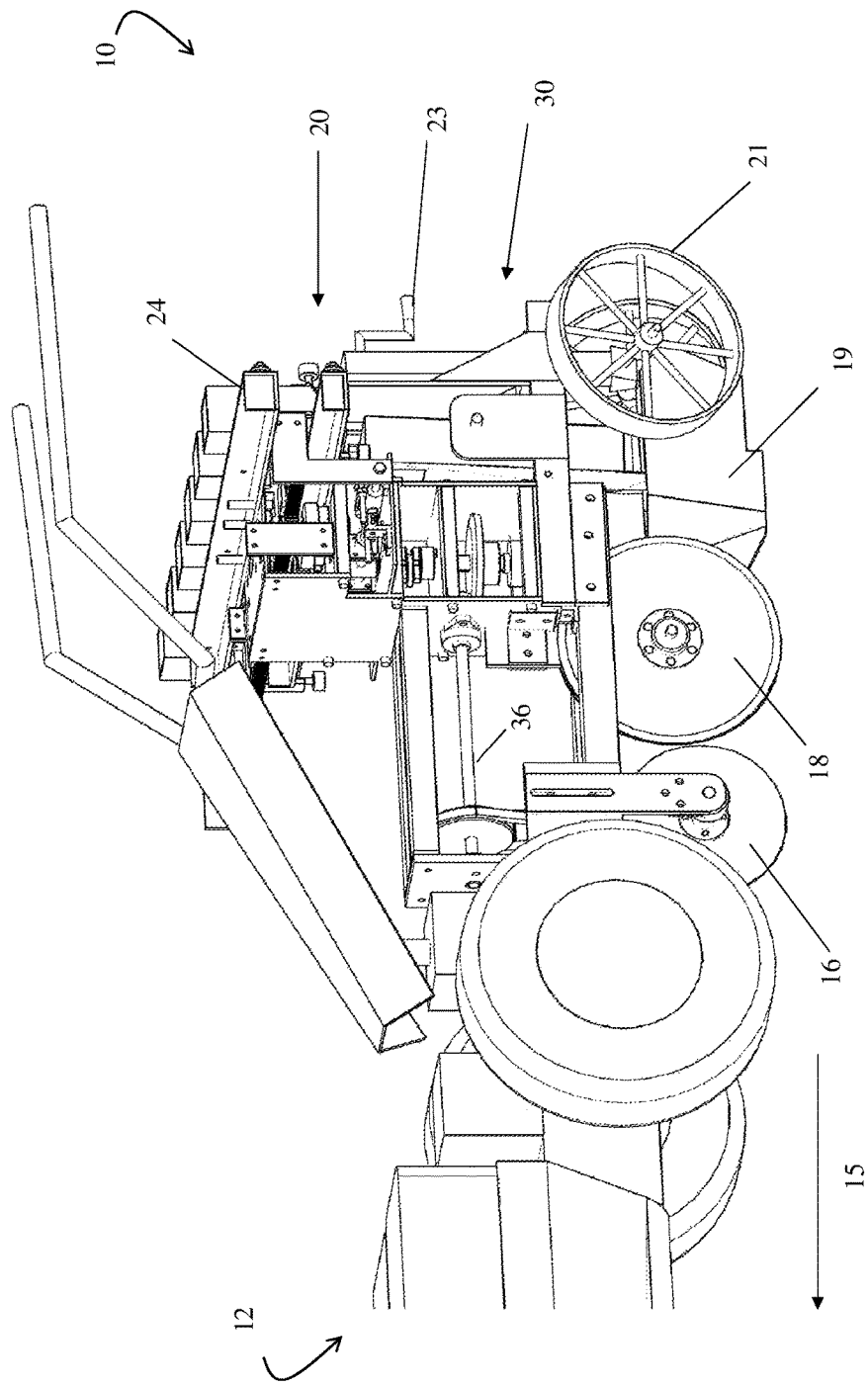
FIG. 1 is a perspective view of the transplanter mounted to a walk-behind tractor.

As generally shown in FIG. 1, the method and apparatus described herein comprises a vegetable transplanter 10 for a walk-behind tractor 12. Essentially, as the tractor 12 and transplanter 10 move in the direction of the arrow 15, a conventional (or active) coulter 16 cuts a crease in the ground and/or crop residue. A set of double disk openers 18 followed by a furrow opening shoe 19 enlarges the crease into a furrow. The seedling transplant system 20 deposits a seedling in the open furrow and a pair of conventional press wheels 21 close the furrow. An adjustment mechanism/handle 23 adjusts the position of the closing press wheels 21 and the depth of the furrow opening shoe 19.

Figure 3:
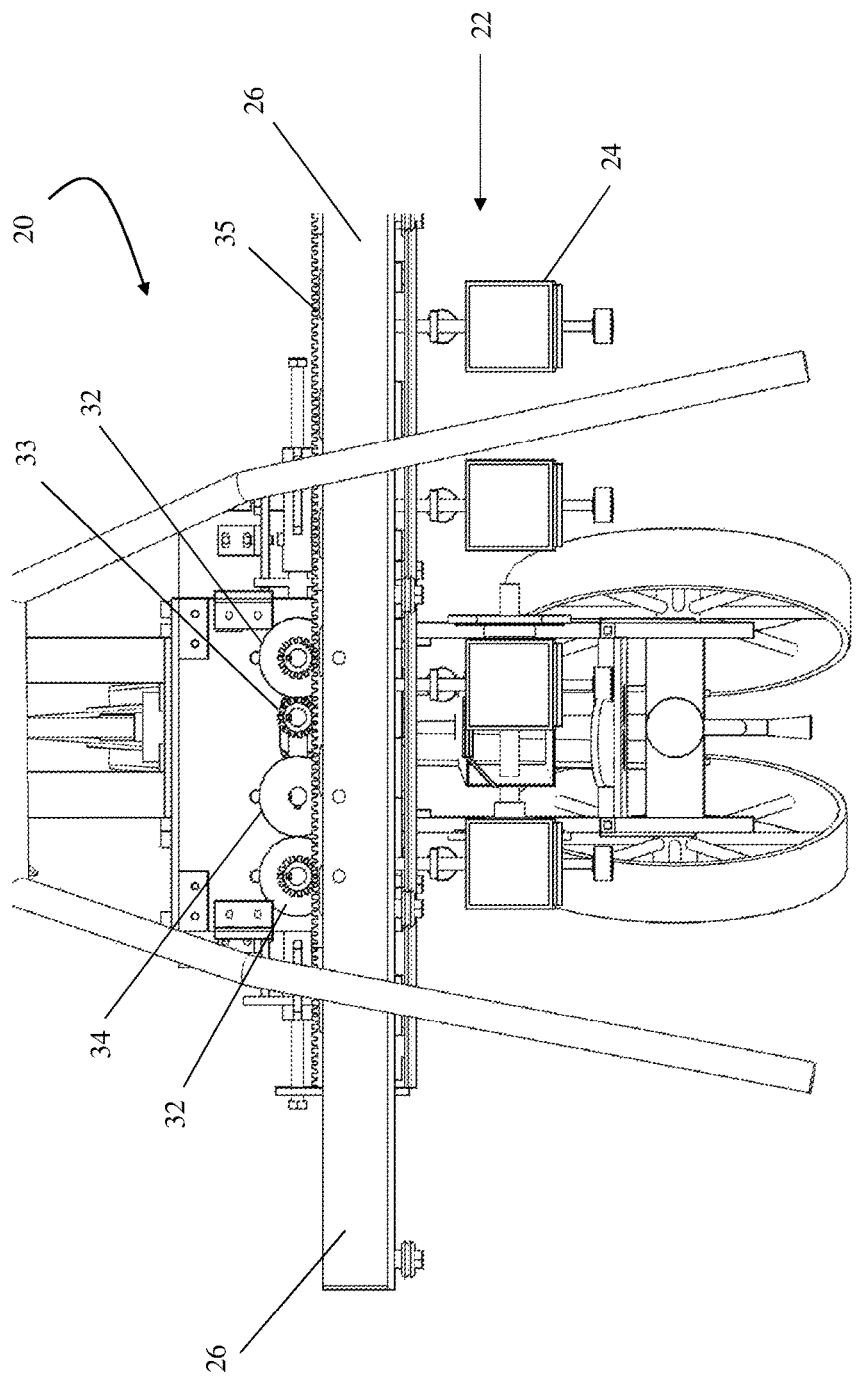
FIG. 3 is a top view of the transplanter with some support bracing removed to show the drive gear assembly that moves the movable (seedling) feeder tube assembly.
Figure 5:
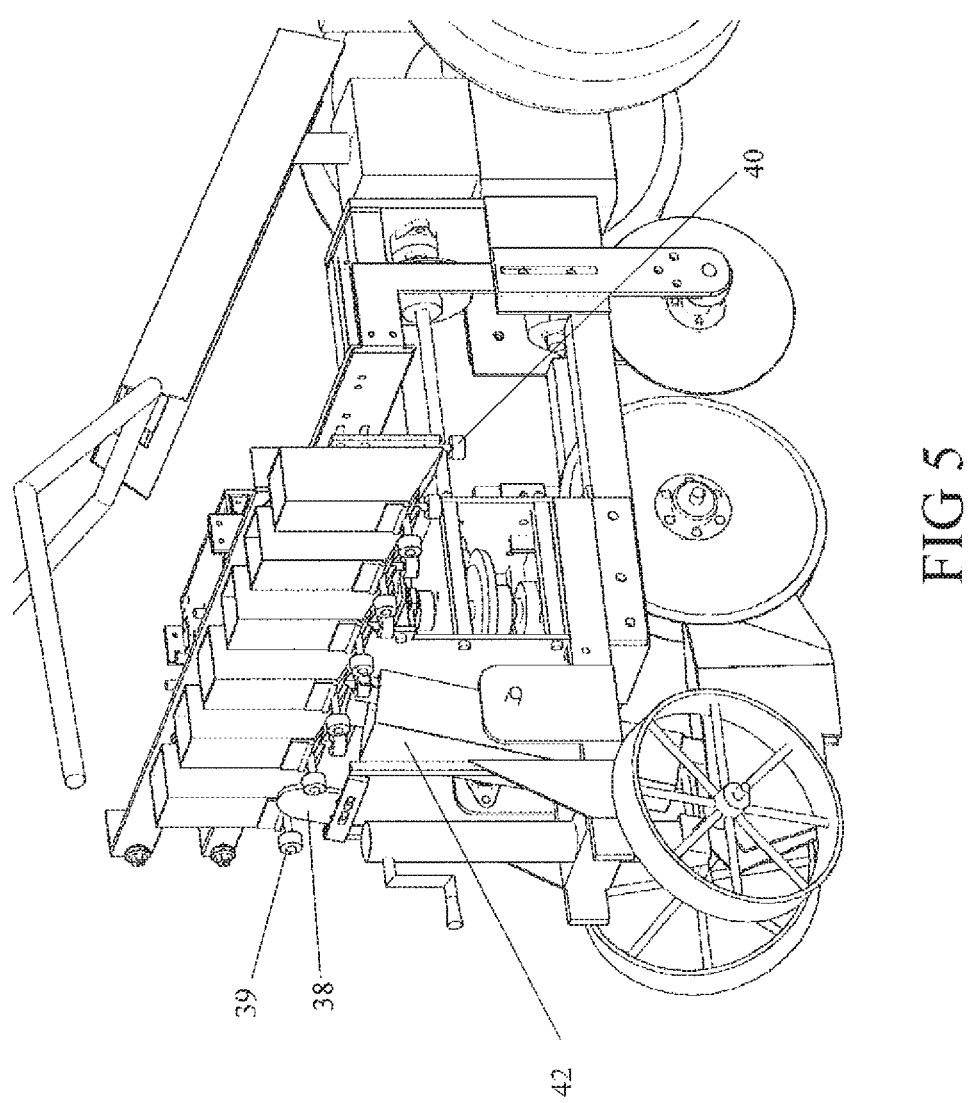
FIG. 5 is a perspective view showing the transfer tube in the pivoted position.

For the purposes of this disclosure, a walk-behind tractor 12 is defined as a tractor that is not generally designed to accommodate a riding operator so that the operator walks behind the tractor 12 and guides the tractor 12 with a linkage that may include handlebars, hand grips, or the like. Typical examples of these types of tractors 12 are manufactured by DR, Troy-Built, Grillo, and BCS. Relevant portions of a walk-behind tractor are shown in FIGS. 1, 3, and 5. Walk-behind tractors 12 are well-known in the art and are clearly distinguishable from conventional tractors by those who are skilled in the farming equipment art.

Figure 2:
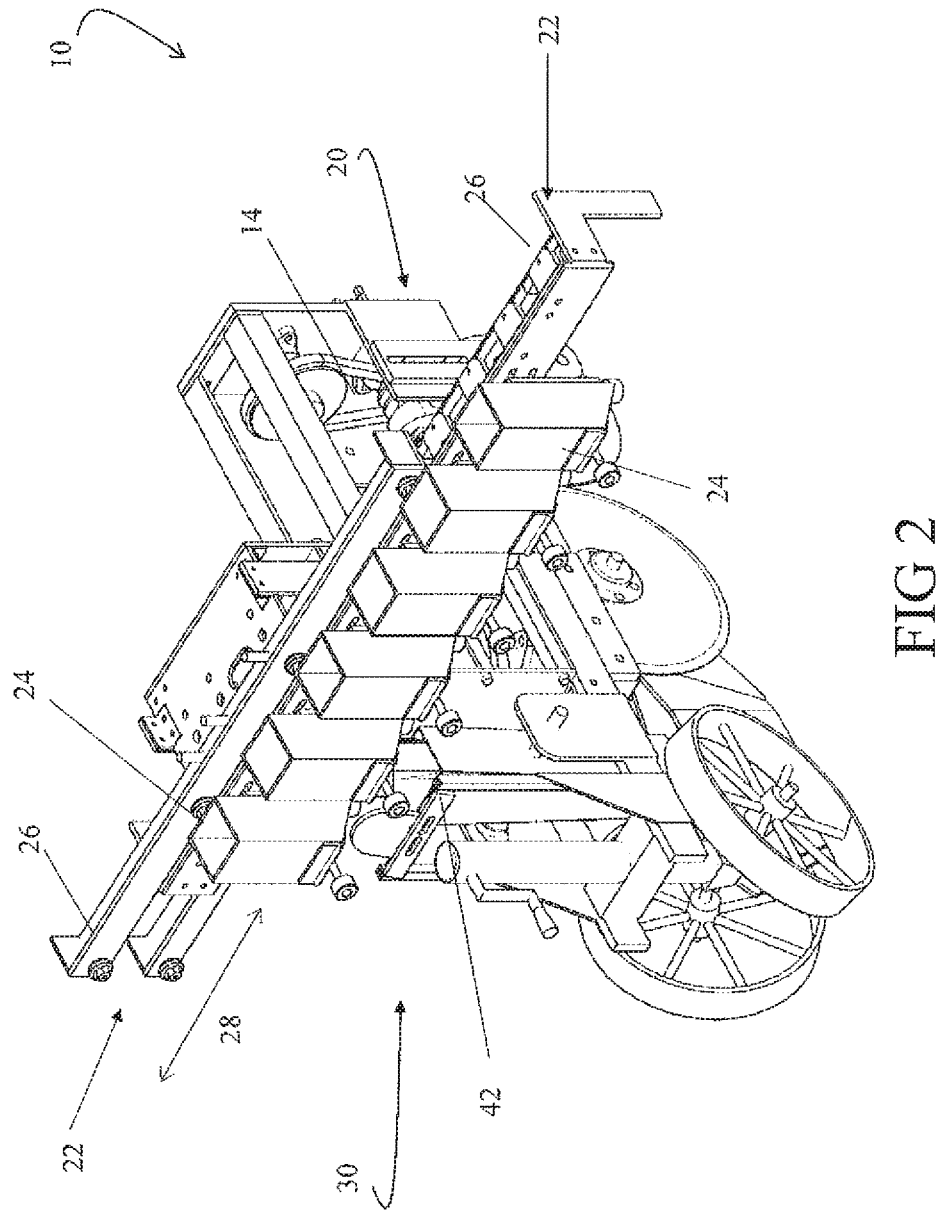
FIG. 2 is a top perspective view of the transplanter disconnected from the walk-behind tractor.

As best shown in FIG. 2, the seedling transplant system 20 comprises a movable feeder tube assembly 22 and a fixed drive system 30. The movable feeder tube assembly 22 comprises a horizontal array of multiple seedling feeder tubes 24 mounted to a rack assembly 26 that moves back and forth latterly (similar to the carriage on an antique manual typewriter) in the directions of the arrow 28. As shown in FIG. 3, a rack 35 and pinion 32, 33 drive mechanism is used to move the feeder tube assembly 22 latterly as the tractor 12 moves forward. Specifically, as best shown in FIG. 3, (fixed position) left and right drive gears 32 mesh with a stationary gear track 35 to cause the array of feeder tubes 24 to move laterally as the tractor 12 advances.

Figure 4:
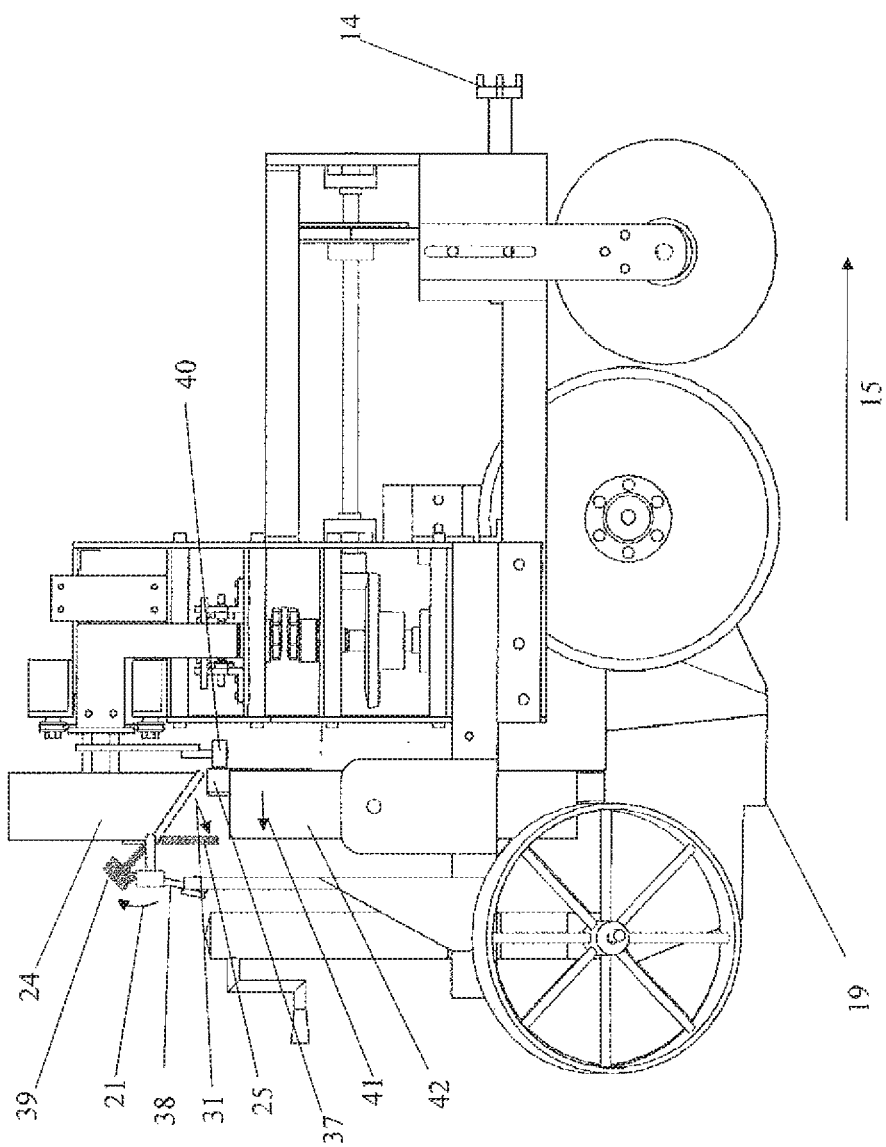
FIG. 4 is a side view of the transplanter disconnected from the walk-behind tractor showing the transfer tube assembly in the vertical (unpivoted) position.

As best shown in FIGS. 1, 3, and 4, the seedling transplant system 20 also includes a drive system 30. The drive system 30 comprises the power transfer components between the tractor and the moveable feeder tube assembly 22. The tractor PTO shaft 14 (best shown in FIG. 4) rotates at 880 about RPM, which is then is reduced to 440 RPM using a belt drive with a 2:1 reduction. The upper horizontal shaft 36 with the larger pulley rotating at 440 RPM is connected to a vertical drive shaft by two perpendicular bevel gears with a ratio of 4:1 causing the vertical shaft to rotate at 110 RPM. As shown in FIG. 3, ultimately, power is transferred to the left and right drive gears 32 and the sliding power gear 33, which remain in a fixed position as the movable feeder tube assembly 22 moves latterly. The reversing gear assembly 34 controls the reversing motion of the feeder tube assembly 22.

Although the preferred embodiment of the drive system 30 is shown and described herein, other means of transferring power from the tractor PTO shaft 14 to the movable feeder tube assembly 22 should be considered within the scope of the invention. Further, the PTO shaft 14 can be used to power an electrical generator that is integrated into the transplanter 10, so that electrical power is used to move the movable feeder tube assembly 22. Alternatively, electrical power from the walk-behind tractor 12 can be used to power the transplanter 10.

As shown in FIGS. 4-7, the seedling transplant system 20 also includes a transfer tube assembly 42 which transfers seedlings from the feeder tubes 24 on the moveable feeder tube assembly 22 to the furrow opening shoe 19 for planting. Specifically, as best shown in FIGS. 2 and 4, as the feeder tube assembly 22 moves laterally, the feeder tubes 24 sequentially pass over a transfer tube 42.

As best shown in FIGS. 2 and 4, as the feeder tubes 24 becomes aligned with the vertical transfer tube 42, a bottom (trap-type) door opens on the feeder tube 24 and the seedling is deposited in the transfer tube 42. The seedling falls vertically down the transfer tube 42 and is deposited in the furrow created by the furrow opening shoe 19. As shown in FIGS. 5 and 7, after the seedling is deposited in the furrow, the transfer tube 42 pivots forward, causing a "kicker" 44 (visible in FIGS. 6 and 7) on the bottom portion of the transfer tube 42 to push the seedling rearwardly, thereby helping to hold the seedling in a vertical position as the press wheels 21 press the soil inwardly around the seedling.

Figure 6:
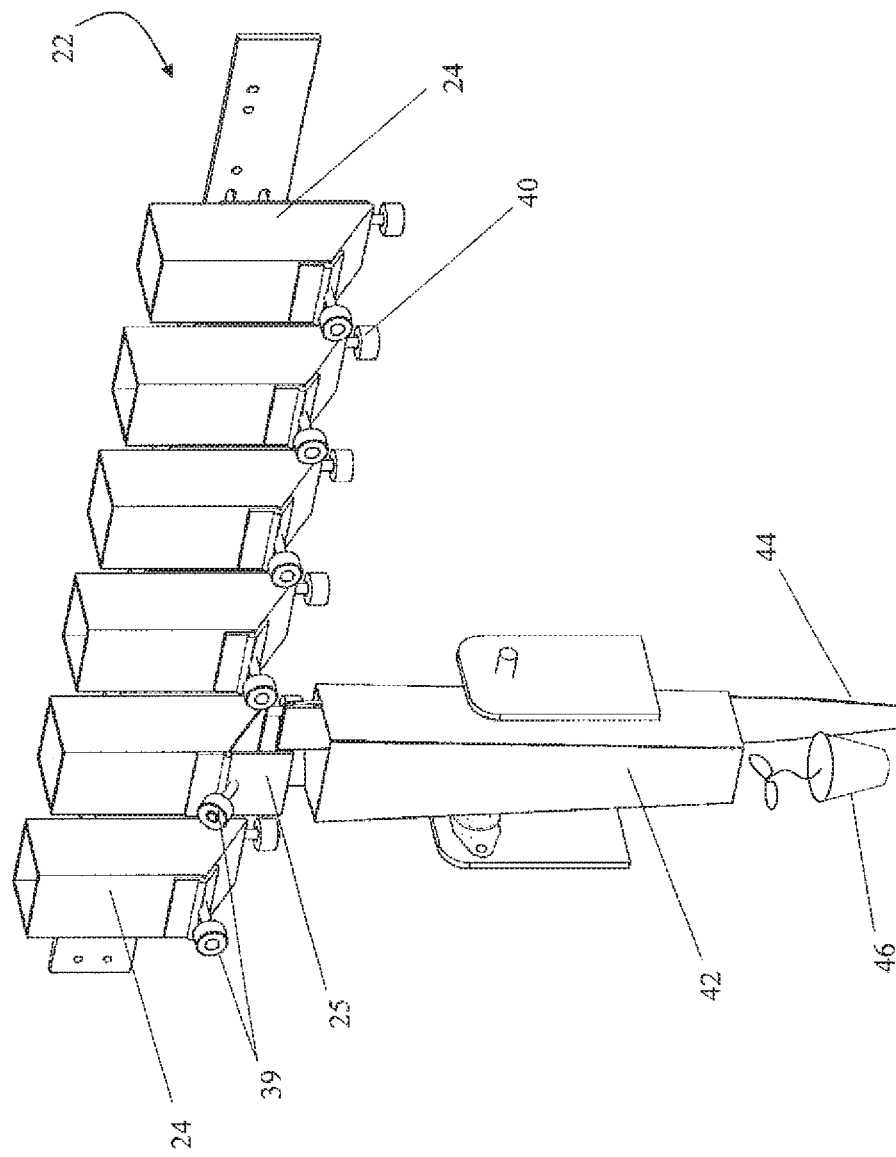
FIG. 6 is an isolated view of the transfer assembly in the vertical position.
Figure 7:
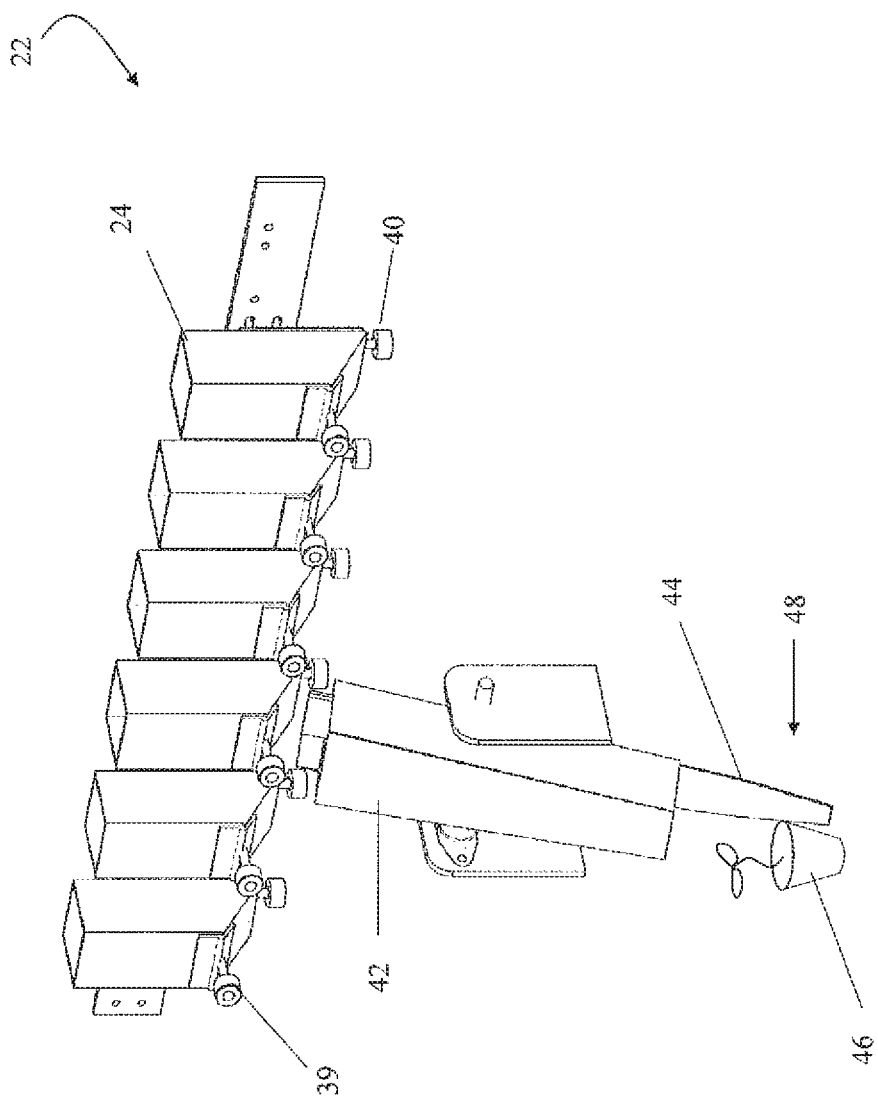
FIG. 7 is an isolated view of the transfer assembly in the pivoted position.

More specifically, as best shown in FIGS. 4 and 6, as the feeder tube 24 approaches the transfer tube 42, a horizontal cam follower 39 (shown in dashed lines) contacts a stationary rounded cam 38 (best shown in FIG. 5), and the cam follower 39 rides up the cam 38 in the direction of the arrow 21 into an "open" range (the cam follower 39 in the open range is shown as darkly shaded in FIG. 4) so that the feeder tube trap door 25 (also darkly shaded in FIG. 4) pivots open in the direction of the arrow 31. Similarly, when the vertical cam follower 40 contacts the u-shaped top 37 of the transfer tube 42 (which acts as a movable cam), the transfer tube 42 pivots (i.e. is pushed forward by the cam follower 40) in the direction of the arrow 41 from its natural, angled position to an upright vertical position.

As best shown in FIGS. 5 and 7, When the feeder tube 24 passes the transfer tube 42, the cam follower 39 rides off of the cam 38 and the trap door 25 closes. Simultaneously, the vertical cam follower 40 rides off of the upper portion of the transfer tube 42 and the transfer tube 42 pivots (i.e. falls back) to its natural, angled (non-vertical) position, as best shown in FIG. 7. As noted above, when the transfer tube 42 pivots back to the angled position, a kicker 44 on the bottom portion of the transfer tube 42 pushes a deposited seedling rearwardly.

FIGS. 6 and 7 show the moveable feeder tube assembly 22 and the transfer tube 42 in isolation to more clearly illustrate the transplanting process. As shown in FIG. 6, as a feeder tube 24 passes over the transfer tube 42, a bottom door 25 of the feeder tube 24 opens and deposits a seedling 46 in the feeder tube 42. The seedling descends down the transfer tube and is deposited in the furrow created by the opening shoe 19 (see FIG. 4). As shown in FIG. 7, after the seedling 46 is deposited, the transfer tube 42 pivots rearwardly in the direction of the arrow 48 so that the seedling 46 remains vertical as the press wheels 21 push the soil around the seedling.

For the foregoing reasons, it is clear that the method and apparatus described herein provides an innovative automated vegetable transplanter that may be used in multiple applications. The current system may be modified in multiple ways and applied in various technological applications. The disclosed method and apparatus may be modified and customized as required by a specific operation or application, and the individual components may be modified and defined, as required, to achieve the desired result. For example, in alternative embodiments, the seedlings could be fed into the feeder tubes by an automatic mechanism. Continuous paper drum feeding mechanisms are known in the art wherein the seedlings are spaced on a paper ribbon and the paper and seedlings are rolled into a drum. As the drum/rolled is unrolled, the paper is cut as the seedlings are deposited in the feeder tube.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

What is claimed is:

1. A transplanter powered by a walk-behind tractor, the transplanter comprising:
   a movable feeder tube assembly, power from a walk-behind tractor power takeoff shaft is directed to move the moveable feeder tube assembly laterally back and forth as the walk-behind tractor advances;
   a plurality of feeder tubes mounted on the moveable feeder tube assembly;
   a pivotable transfer tube positioned below the moveable feeder tube assembly;
   wherein, as one of the feeder tubes aligns with the transfer tube, a seedling in the feeder tube is deposited in the transfer tube so that the seedling descends down the transfer tube into a furrow for planting.

2. The transplanter of claim 1 wherein, after the seedling is placed in the furrow, the transfer tube pivots so that a kicker panel on the transfer tube pushes the seedling rearwardly.

3. The transplanter of claim 1 wherein the movable feeder tube assembly comprises a rack that meshes with a stationary gear pinon system on the transplanter so that the movable feeder tube assembly is moved laterally back and forth as the walk-behind tractor advances.

4. The transplanter of claim 1 wherein the feeder tube assembly comprises a stationary gear track which meshes with left and right drive gears to move the movable feeder tube assembly laterally back and forth as the walk-behind tractor advances.

5. The transplanter of claim 4 wherein the transplanter further comprises a sliding power gear and a reversing gear assembly.

6. The transplanter of claim 1 wherein the transplanter is powered by a shaft of a power take off (PTO) of a walk-behind tractor.

7. The transplanter of claim 1 wherein a bottom trap-type door on the feeder tube opens so that the seedling slides out of the feeder tube and down the transfer tube.

8. The transplanter of claim 1 wherein the transplanter has at least three feeder tubes.

9. The transplanter of claim 1 wherein the transplanter has at least six feeder tubes.

10. The transplanter of claim 1 wherein the transplanter is structured so that a single operator can drive the walk-behind tractor and also operate the transplanter by adding a seedlings to the feeder tube.

11. The transplanter of claim 1 wherein a coulter, a double disk opener, and a furrow opening shoe create the furrow.

12. The transplanter of claim 1 wherein a set of press wheels closes the furrow around the seedling.

13. A method of transplanting a plant:
(a) providing the transplanter of claim 1;
(b) filling the feeder tubes with seedlings;
(c) directing the transplanter across a field so that the transplanter plants the seedlings in a furrow.

14. The method of claim 13 further comprising:
(d) after the seedling is placed in the furrow, pivoting the transfer tube so that a kicker panel on the transfer tube pushes the seedling rearwardly.

15. The method of claim 14 further comprising:
(e) using a set of press wheels to press soil around the seedling.

16. A transplanter powered by a walk-behind tractor, the transplanter comprising a horizontally moving assembly comprising a plurality of feeder tubes with seedlings inside the feeder tubes, the feeder tubes being positioned above a transfer tube so that when one of the feeder tubes aligns with the transfer tube, a bottom door on the feeder tube opens and the seedling travels down the transfer tube and into a furrow;
wherein power from the walk-behind tractor power takeoff shaft is directed to move the horizontally movable assembly laterally back and forth as the walk-behind tractor advances.

17. The transplanter of claim 16 wherein, after the seedling is deposited in the furrow, the transfer tube pivots and a kicker panel on the transfer tube pushes the seedling rearwardly and away from the transplanter.

18. A method of making a transplanter, the method comprising the steps of:
(a) providing a drive assembly from a walk-behind tractor;
(b) connecting a movable feeder tube assembly so that power from a walk-behind tractor power takeoff shaft is directed to move the movable feeder tube assembly laterally back and forth as the walk-behind tractor advances;
(c) installing a pivotable transfer tube below the moveable feeder assembly.

19. The method of claim 18 further comprising:
(d) securing a kicker panel to a bottom portion of the pivotable transfer tube so that when the transfer tube pivots, the kicker tube is positioned to push a seedling rearwardly.

* * * * *